United States Patent [19]

Telesio

[11] 4,231,708
[45] Nov. 4, 1980

[54] TRANSFER OF QUICK-DISCONNECT ENGINE MODULES FROM VEHICLES

[76] Inventor: George O. Telesio, 7709 S. Milna Ave., Whittier, Calif. 90601

[21] Appl. No.: 937,109

[22] Filed: Aug. 28, 1978

[51] Int. Cl.³ .......................... B65G 67/02; B60S 5/02
[52] U.S. Cl. .................................... 414/343; 105/133; 180/294; 180/298; 248/544; 248/647; 248/676; 269/17
[58] Field of Search ...................... 180/294, 298, 68.5; 248/647, 646, 678, 676, 637, 544, 670, 671, 649, 650; 280/79.1 A, 79.1 R, 79.3; 269/17; 414/347, 349, 343, 346; 105/133; 16/35 R

[56] References Cited

U.S. PATENT DOCUMENTS

| 1,648,875 | 11/1927 | Griese | 180/298 |
| 2,035,212 | 3/1936 | Alborn | 180/298 X |
| 2,477,250 | 7/1949 | Hincz | 414/347 X |
| 3,435,969 | 4/1969 | McCartney et al. | 414/343 X |
| 3,467,981 | 9/1969 | Peter | 16/35 R |
| 3,783,964 | 1/1974 | Telesio | 180/294 |
| 3,876,086 | 4/1975 | Kappei | 414/343 |
| 3,949,976 | 4/1976 | Cofer | 269/17 |

FOREIGN PATENT DOCUMENTS 1044688 6/1953 France ................................. 180/68.5

Primary Examiner—John J. Love
Assistant Examiner—Milton L. Smith
Attorney, Agent, or Firm—Christie, Parker & Hale

[57] ABSTRACT

A service cart is provided for transferring thereto and therefrom a vehicle engine assembly which includes a support frame having parallel side members to each of which a set of rollers is mounted. The frame is releasably matable with a vehicle chassis for movement into and out of an operative position in the vehicle through an end of the chassis. The cart comprises a base and a pair of rails with which the frame rollers are engageable. The rails are movably mounted on the base, in parallel relation and spaced a distance corresponding to the spacing between the frame rollers, by an arrangement which includes means guiding the rails vertically relative to the base. The rail mounting arrangement also includes jack means coupled between the base and the rails for adjusting the vertical spacing between the base and each end of the rails.

8 Claims, 6 Drawing Figures

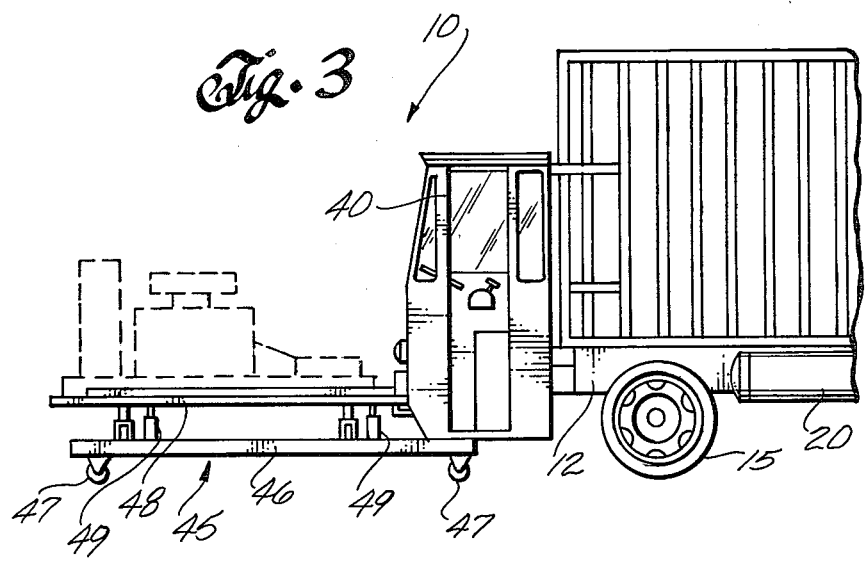

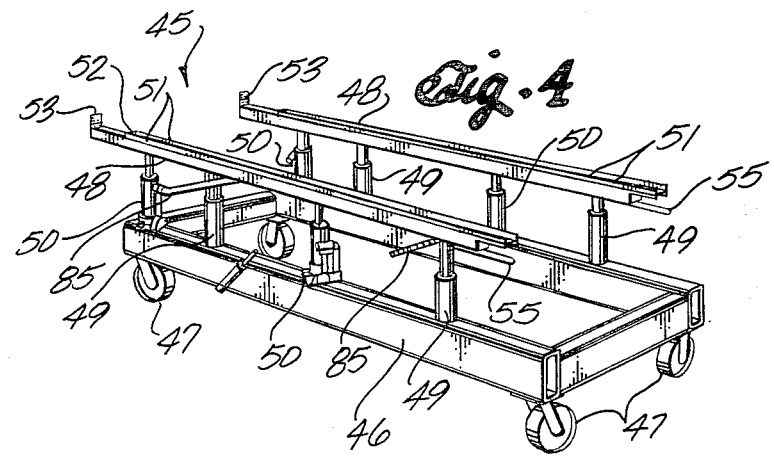
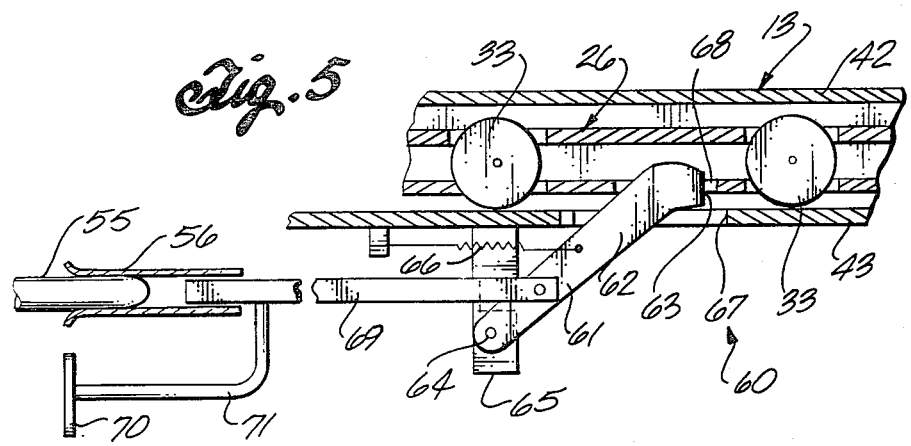
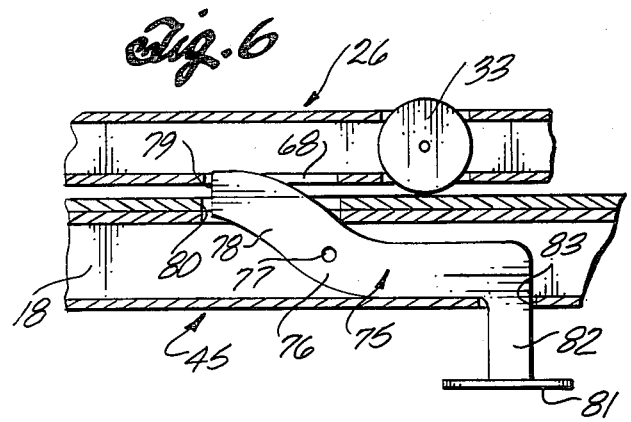

TRANSFER OF QUICK-DISCONNECT ENGINE MODULES FROM VEHICLES

INCORPORATION BY REFERENCE

The drawings and description, but not the claims, of U.S. Pat. No. 3,783,964, issued Jan. 8, 1974, are incorporated herein by reference as though fully set forth at this point. Patent 3,783,964 is sometimes referred to herein as "the referenced patent."

BACKGROUND OF THE INVENTION

1. Field of the Invention

This invention pertains to vehicles having removable engine modules. More particularly, it pertains to a service cart which is useful to transport an engine module to a disabled vehicle, to receive from the disabled vehicle the engine module thereof, or to supply a new engine module to the vehicle.

2. Review of the Prior Art

My prior art U.S. Pat. No. 3,783,964, the referenced patent, describes my earlier invention pertaining to vehicles having removable engine modules. The advantages of such vehicles are described extensively in the introductory portion of the referenced patent and are not here repeated in detail. Briefly, however, substantial economies and advantages in vehicle maintenance and operation are achieved when a vehicle, particularly a commercial vehicle such as a refuse truck, bus or other heavy duty vehicle, is constructed so that the engine is provided as a module which is readily removable from the vehicle chassis. These advantages and economies are maximized, in my experience, when the module is removable from an end of the chassis.

The referenced patent describes an arrangement in which a quick-disconnect engine module is removable from an end of a vehicle chassis by linear movement along the chassis out of an operative secure position of the module in the chassis. The referenced patent describes various arrangements for enabling quick connection or disconnection of the engine controls and drive shaft to and from the cooperating controls and mechanisms in the vehicle; my copending patent application Ser. No. 937,108 filed Aug. 28, 1978 describes certain improvements in these interconnections. These arrangements make it possible to easily and quickly remove the engine module, which preferably includes the engine, radiator and a transmission, from the vehicle as when a malfunction of the engine occurs so as to require a repair or service operation.

Assuming the existence of a vehicle having a quick-disconnect engine module of the character described, a need exists for auxiliary equipment to receive the engine module from the vehicle for supporting the engine module after removal of the module from the vehicle. Such equipment facilitates efficient repair or service of the module. The auxiliary equipment can also be used to facilitate removal of an engine module from a disabled vehicle and to insert a new module into a vehicle. The auxiliary equipment should also be useful for transporting an engine module to a disabled vehicle in the field and for enabling rapid exchange of engine modules at the location where the vehicle became disabled.

SUMMARY OF THE INVENTION

This invention is addressed to the needs identified above. It addresses these needs by providing a service cart which is useful to support thereon an engine module for a vehicle, and to transfer the module therefrom and thereto to and from a vehicle, with which the module is matable, through an end of the vehicle. The cart is arranged for use in the field in exchanging engine modules of a vehicle in an efficient manner. The cart provides an efficient support for a module during repair or service of the module components.

Generally speaking, in terms of apparatus, this invention provides a service cart for the transfer thereto and therefrom of a vehicle engine module which includes a support frame having parallel side members; the frame is releasably matable with a vehicle chassis for movement into and out of an operative position in the vehicle through an end of the chassis. The cart includes a base and a pair of rails which are engageable with the module frame side members. The rails are movably mounted on the cart base in parallel relation at a spacing which corresponds to the spacing between the module frame side members. The rail mounting includes guide means for guiding the rails vertically relative to the base, and means for adjusting the vertical distance between the base and each end of the rails.

The vertical adjustment of the rails relative to the cart base provides efficiencies in positioning the cart adjacent the end of a vehicle in the field for transfer of an engine module either from the cart to the vehicle or from the vehicle to the cart. In the field, the terrain may be uneven; the positional adjustability of the rails on the cart makes it possible to position the rails so that they are aligned with the module frame supports in the vehicle, whereby the module can be moved readily between the vehicle and the cart.

DESCRIPTION OF THE DRAWINGS

The above-mentioned and other features of this invention are more fully set forth in the following detailed description of the presently-known best mode of practicing the invention, which description is presented with reference to the accompanying drawings, wherein:

FIG. 3 is a fragmentary side elevation view of the vehicle and of the engine service cart according to this invention;

FIG. 4 is a perspective view of the engine service cart;

FIG. 5 is a fragmentary cross-sectional elevation view of an engine module latch mechanism in the vehicle; and FIG. 6 is a fragmentary cross-sectional elevation view of an engine module latch mechanism in the cart.

DESCRIPTION OF THE ILLUSTRATED EMBODIMENT

Figure 1:
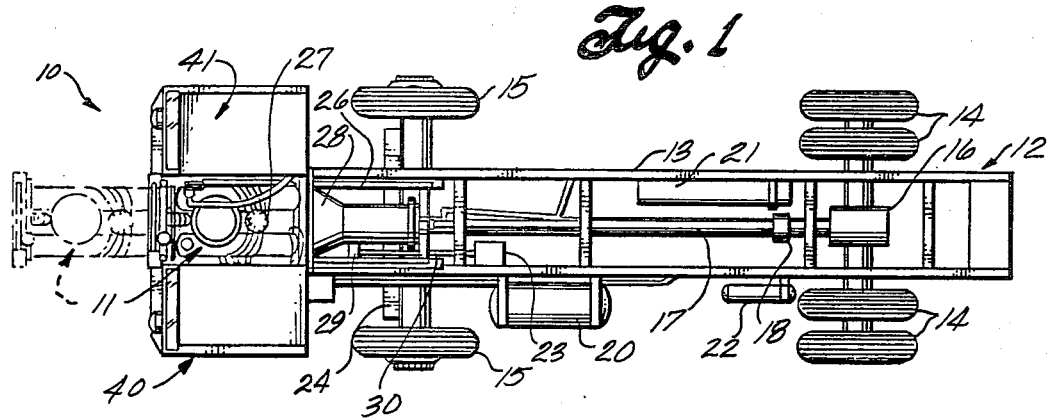
FIG. 1 is a top plan view of a vehicle having a removable engine module.

A vehicle 10, equipped with a movable modular engine assembly 11, is shown in plan view in FIG. 1. Vehicle 10 can be a refuse collection truck, for example, and, if so, the same is shown in FIG. 1 with the refuse storage bin thereof removed for the purposes of illustration of the principles of this invention. Vehicle 10 includes a chassis 12 which is composed principally of an elongate structural frame 13 and supporting wheels including driven rear wheels 14 and steerable front wheels 15 suitably connected to the frame in a known manner. A rear axle assembly, to which driven wheels 14 are mounted includes a differential 16 to which is connected a drive shaft 17. A universal joint 18 is present in the drive shaft adjacent the differential. The drive shaft extends forwardly from the differential toward the retracted or operative position of engine module 11, which position of the module is shown in solid lines in FIG. 1. Further components of the vehicle chassis include a fuel tank 20, a compressed air tank 21, a hydraulic fluid reservoir 22, a hydraulic pump 23, and a power steering mechanism 24.

Figure 2:
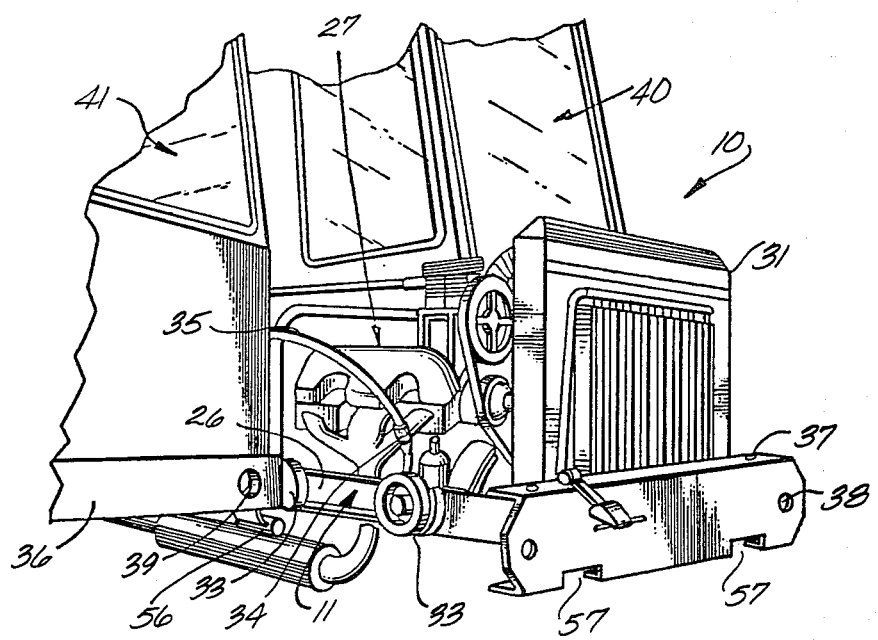
FIG. 2 is a perspective view of the front portion of the vehicle shown in FIG. 1 and illustrates the engine module in a partially extended position relative to vehicle chassis.

As shown best in FIGS. 1 and 2, engine assembly module 11 includes a support frame 26 to which is mounted an internal combustion engine 27 and a transmission 28. The engine and transmission are coupled directly together and both are supported on frame 26. The transmission output shaft is coupled to the forward end of drive shaft 17 and preferably a universal joint, not shown, is included in the drive shaft closely adjacent the transmission. The coupling of the transmission output shaft to the drive shaft is a spline coupling. If desired, and as shown, the transmission can include a power take-off output gear box 29 having a power take-off shaft 30 connected thereto. The power take-off is operable, under the control of an operator of the vehicle, for driving an auxiliary mechanism in the vehicle, such as hydraulic pump 23 as shown in FIG. 1. A radiator 31 is also mounted directly to engine module support frame 26 in association with engine 27 in a known manner as shown in FIG. 2.

The operative, retracted, or home position of engine module 11 is at the front end of vehicle 10. The support frame for the engine module is mounted to the vehicle frame 13 for linear movement along a line parallel to the elongate extent of the chassis from its operative position, shown in solid lines in FIG. 1, forwardly therefrom to an extended position, shown in broken lines in FIG. 1 and also shown in FIG. 2. Preferably, vehicle frame 13 is defined, at least in part, by structural steel members, such as channels or I-beams having vertically spaced, horizontally extending upper and lower flanges 42 and 43 (See FIG. 5). Such structural members are disposed in the vehicle frame in parallel relation to each other in alignment with the elongate extent of the frame with their flanges extending toward each other. The module support frame 26 is movably supported between the vehicle frame flanges by means of a plurality of roller wheels 33 which are carried by module support frame 26 and which cooperate with and between the horizontal surfaces of the vehicle frame structural member flanges.

A set of roller wheels 33 is associated with each of the two parallel longitudinal sides of the module support frame.

The spline connection between the transmission output shaft and drive shaft 17 affords ready disassociation of the transmission output shaft from the vehicle drive shaft as the engine module is moved forwardly from its operative position in the vehicle. A similar spline connection in power take-off shaft 30 is desirable. My prior patent 3,783,964 describes positioning mechanisms which preferably are included in vehicle 10 in association with the spline connections in the drive shaft and the power take-off shaft for holding the components of such connections in predetermined positions as the engine assembly is moved into and out of its operative position in the vehicle, thereby to facilitate automatic reconnection of the spline connections as the engine assembly is moved into its operative position. Other couplings between the components of the removable engine module and the vehicle itself are provided by quick-disconnect mechanisms, such as quick-disconnect coupling 34 (see FIG. 2) associated with fuel line 35.

Preferably, as shown in FIG. 2, the operative or home position of engine module 11 in vehicle 10 is so defined that the extreme front end of the module is substantially aligned with transverse outer bumper members 36 which are carried by the vehicle. Accordingly, a structural member 37 is disposed transversely of the extreme front of module 11 to define a central portion of the vehicle bumper when the module is in its operative or retracted position. The module is secured in its retracted position in the vehicle chassis by passing bolts through holes 38 formed through each end of the central bumper section 37 and into threaded holes 39 formed in the inboard ends of outer bumper sections 36.

As shown in FIGS. 1 and 2, an operator's cab 40 is mounted to the vehicle chassis to one side of the retracted position of the engine assembly and a passenger cab 41 is mounted to the chassis on the other side of the engine assembly.

FIG. 4 is a perspective view of an engine module service cart 45; FIG. 3 shows the cart mated to the front end of vehicle 10 for receipt of engine module 11. In FIG. 3, the engine module is represented in broken lines in the position which it occupies when it is fully received on the cart. The cart is composed of an elongate, rectangular frame 46 fabricated of structural steel elements. A castered wheel 47 is mounted to each corner of the frame for rollably supporting the frame on a suitable support surface. A pair of elongate rails 48 are mounted in spaced parallel relation on the cart base and are aligned with the elongate extent of the base. A pair of telescoping guide assemblies 49 cooperate between the lower portions of each rail, adjacent the opposite ends thereof, and the base to mount the rails to the base for movement vertically relative to the base. A pair of jack mechanisms 50, such as hydraulic jacks, are also coupled between each rail and the base at spaced locations along each rail. The jacks are operable for adjusting the vertical distance between the base and each end of each rail. The rails are supported only from below on the cart frame and are not otherwise interconnected. This enables the rails to be adjusted in position on the base independently of each other. It also enables the cart to be used conveniently as an engine support during repair of a disabled engine module located on the frame.

The spacing between the rails is equal to the spacing between the sets of rollers 33 along each of the parallel sides of engine module frame 26 so that, when the cart is mated to the vehicle as shown in FIG. 3 and the elevation of the rails is properly adjusted by operation of jacks 50, the vehicle engine module 11 may be rolled out of the vehicle chassis and onto the upper surfaces of the cart rails. To assure that the module roller wheels will not slip from the cart rails, each rail has an upstanding flange 51 along each of its opposite longitudinal edges.

Functionally, each cart rail 48 has a vehicle or rear end and an opposite front end. As shown in FIG. 4, at the vehicle end of each rail the U-shaped track defined by flanges 51 and the upper surface of each rail 48 is open. At its opposite end, a roller stop member 52 extends between roller guide flanges 51 and, as an additional safety precaution, a further stop member 53 extends upwardly from the extreme front end of each rail member. Stops 52 cooperate with the forwardmost rollers on the engine module support frame, whereas stop members 53 cooperate with the central bumper section 37 which is a component of the removable vehicle engine module.

A locating pin 55 is associated with the vehicle end of each cart rail 48, as shown in FIG. 4. Each locating pin is secured to the underside of its rail and extends a desired distance and parallel to the elongate extent of the rail. The locating pins cooperate with a pair of locating sockets 56, one of which is shown in FIG. 2. The locating sockets are carried by the vehicle frame adjacent the front end of the vehicle, and preferably are tubular members which are aligned parallel to the path of movement of the engine module in the vehicle. The locating sockets are centered the same distance below the lower extents of roller wheels 33 as the locating pins are spaced below the upper surfaces of cart rails 48.

To enable the vehicle ends of the cart rails to be mated to the vehicle frame by cooperation of the locating pins and sockets, the lower portion of the central bumper member is recessed at two locations 57. Recesses 57 are directly forward of the corresponding engine module roller wheels 33.

It will be appreciated that there are many times when it is desirable to have access to engine 27 in vehicle 10 for routine service of the engine. For example, such access may be needed to change the engine oil or spark plugs, or to perform a minor tune-up on the engine; it is not necessary that the engine module be removed entirely from vehicle 10 in such instances. Accordingly, it is desirable that engine module 11 have an extended, but not removed, position in the vehicle forwardly of its operative or home position which is shown in solid lines in FIG. 1. The extended or maintenance position of the engine module is the condition shown in FIG. 2. It is also desirable that the engine module be positively latched or otherwise prevented from moving forwardly of its extended position in the vehicle frame, but that the latch mechanism (which cooperates between the vehicle frame and the engine module to define the extended position of the module in the frame) be capable of being overridden when cart 45 is mated to the vehicle. If the latch mechanism is not capable of being overridden, it is not possible to fully remove the engine module from the vehicle and transfer it from the vehicle to cart 45. A suitable latch mechanism 60 operable for preventing the engine module from moving forwardly of its extended position in the vehicle frame in the absence of a service cart forwardly of the vehicle to receive the module, is shown in FIG. 5. Preferably, one such latch mechanism is associated with each side of the engine module.

A vehicle latch mechanism 60 for automatically engaging between the vehicle frame and the module support frame, for defining an extended position of the engine module in the vehicle, is shown in FIG. 5. The latcch mechanism includes a pivotally movable pawl 61 which has an upper dog end 62 defining a rearwardly-facing stop surface 63. The pawl has a forward lower end which is pivoted, as at 64, to a suitable bracket 65 connected to the vehicle frame, such as to the lower flange 43 of the frame structural member upon which the engine module roller wheels 33 are positioned during those times when the engine module is supported in the vehicle. A spring 66 is connected between pawl 61 and the vehicle frame to bias the pawl to rotate counterclockwise about pivot 64. In such rotation, the dog end of the pawl moves upwardly and forwardly. Preferably the upper end of the pawl passes through an aperture 67 formed in lower vehicle frame flange 43 so that the curved upper portion of the dog end of the pawl normally rides against the lower surface of the side of the module support frame to which roller wheels 33 are mounted. An aperture 68 is formed in the engine module support frame at such a location on the frame that aperture 68 substantially registers with aperture 67 when the engine module is disposed in its extended position in the vehicle, as shown in FIG. 2. As aperture 68 moves into registry with aperture 67, the upper dog end 62 of pawl 61 moves into aperture 68 under the bias of spring 66 so that pawl stop surface 63 interferes with the rear boundary of aperture 68 to prevent further forward motion of the engine module in the vehicle. In this way, the engine module is prevented from further movement in the vehicle forwardly from its operative position.

Preferably, each of vehicle latch mechanisms 60 is disposed rearwardly of a cart locating socket 56 in sufficient alignment with the socket that the socket and the latch pawl can be interconnected by a release rod 69. The release rod has its rear end pinned to pawl 61 intermediate the length of the pawl, and has its forward end slidably received in the rear portion of the tubular locating socket 56. When latch 60 is engaged, as shown in FIG. 5, the forward end of the release rod is sufficiently engaged in locating socket 56 to interfere with full entry of a cart locating pin 55 into the socket. It will be apparent that, as the cart locating pin is moved into full engagement with the locating socket, the end of the locating pin engages the forward end of the latch release rod and drives the rod rearwardly. Rearward motion of the latch release rod moves the pawl clockwise about its pivot 64 against the bias of spring 66 to cause the dog end of the pawl to move out of aperture 68, thereby overriding latch 60. When the latch is overridden, the engine module is freed for further movement forwardly in the vehicle frame toward cart 45 which, by virtue of the cooperation of both of locating pins 55 in both of locating sockets 56, is then in proper position to safely receive the engine module.

The upper portion of the dog end latch pawl 61 is suitably contoured so as not to interfere with motion of the engine module in either direction between its operative and extended positions in the vehicle frame, and so as not to interfere with movement of the engine module from cart 45 into the vehicle frame to and rearwardly beyond its extended position.

There may be times when it is desired to manually override the operation of latch 60, i.e., to operate the latch manually other than by way of engagement of a cart locating pin 55 in locating socket 56. Accordingly, a push plate 70 is disposed below the forward end of each receiving socket 56 and is connected by a suitable rod 71 to the latch release rod at a point on the release rod to the rear of the corresponding locating socket. The application of manual force to the push plate drives the release rod rearwardly, thereby disengaging the latch from cooperation with the engine module support frame.

The presence of two stop elements 52 and 53 at the forward end of cart rails 48 was described above. These stop elements serve to prevent an engine module received in the cart from moving forwardly off the rails. It is also desirable that the cart include means for securing an engine module from movement rearwardly off the rails, particularly during those periods when the cart, with the engine module supported thereon, is not mated to a vehicle. Accordingly, a cart latch mechanism 75 is associated with each of the cart rails for cooperation with the support frame of an engine module received on the cart for preventing the module from moving rearwardly on the rails.

A cart latch mechanism 75 according to this invention is shown in FIG. 6. A cart latch mechanism is provided on each rail adjacent the rear or vehicle end thereof. Each cart latch mechanism preferably cooperates with the same aperture 68 in the engine module frame 26 with which the vehicle latch mechanism 60 cooperates, but it is within the scope of this invention that the cart latch can cooperate with some other structural feature of the engine module if desired. As shown in FIGS. 4 and 6, it is preferred that each cart rail 48 be defined by a length of structural steel tubing. Each cart latch 75 includes an elongate pawl 76, the major portion of which is disposed in the rail tube. Each pawl is pivoted, as at 77, to the rail tube intermediate its length rearwardly of a dog end 78 of the pawl which defines a forwardly-facing stop surface 79. Pivot 77 is located forwardly of the center of gravity of the pawl so that the pawl is biased by gravity to turn clockwise about its pivot toward a limiting position, shown in FIG. 6, in which the portion of the pawl to the rear of the pivot rests upon the lower wall of the rail tube. The dog end of the pawl cooperates with an aperture 80 formed through the upper wall of the rail tube. The pawl can move about its pivot into its limiting position only when aperture 68 of the engine module support frame is registered with aperture 80, thereby enabling the dog end of the pawl to move upwardly into aperture 68. Pawl stop surface 79 then can engage the forward boundary of aperture 68 to prevent motion of the engine module rearwardly along rail 48. Latch 75 is released from cooperation with the engine module support frame by pushing upwardly on a push plate 81 which is connected to a tang 82 which depends downwardly from the rear end of pawl 76 through an opening 83 formed in the bottom wall of the rail tube.

To enable convenient movement of cart 45 on its wheels 47 across a supporting surface, a pair of handles 85 extend fixedly laterally from each of rails 48 adjacent their opposite ends.

Preferably each of cart wheels 47 is lockable against rotation about its axle so that the cart, if disposed upon a grade, can be secured from rolling downhill. This is a particularly desirable feature since it may be necessary to use the cart to change the engine of a disabled vehicle headed downhill on a grade. Selective lockability of the cart wheels also enables the cart to be secured on the bed of a lift gate truck, for example, in the course of transporting an operative engine module from a central service location to the location of a disabled vehicle.

The utility of cart 45 is apparent in the context of a fleet of vehicles each equipped with a removable engine module 11. Depending upon the number of vehicles in the fleet, the fleet operator will determine how many spare engine modules are required for effective maintenance and service of the fleet. One cart 45 is provided for each spare engine module, plus at least one additional cart. If one of the vehicles should break down at a location remote from a central vehicle service facility where the spare engine modules are normally stored, a spare engine module, ready and waiting on its service cart, can be loaded readily onto a lift gate flatbed truck. The extra service cart, having no engine module thereon, is also loaded on the truck. The truck is then dispatched to the location of the disabled vehicle, and both carts are unloaded from the truck. The empty cart is first rolled into position adjacent the front end of the disabled vehicle and the locating pins of the cart are mated in the locating sockets of the disabled vehicle. The cart jacks are operated to approximately align the cart rails with the side members of the engine module support frame in the disabled vehicle. The inoperative engine module is moved forwardly in the vehicle frame from its operative position onto the cart, and is automatically latched in position on the cart by operation of cart latch mechanism 75. The cart, with the disabled engine module thereon, is then wheeled away from the front end of the vehicle, and the cart bearing the operative spare engine module is wheeled into mating engagement with the front end of the vehicle, the cart rails are positionally adjusted to be in alignment with the vehicle frame, the cart latch mechanisms 75 are operated to release the operative engine module relative to the cart, and the operative module is rolled into position in the vehicle. Inasmuch as both engine modules and the vehicle preferably include the spline coupling positioning elements described in the referenced patent, the replacement engine module is automatically coupled to the vehicle drive shaft as the replacement module is moved into its operative position in the vehicle.

Using a pair of service carts of the type described above, an inoperative engine module can be exchanged for an operative engine module very readily within a period of five minutes following arrival of a truck bearing the operative engine module and a spare service cart at the location of the disabled vehicle. If the module exchange operation is to be carried out on a level surface, such that no positional adjustments of the cart rails relative to the cart bases requiring operation of the cart jacks is necessary, then the module exchange process can be accomplished much more rapidly, say, within two minutes.

Persons skilled in the art to which this invention pertains will appreciate that the preceding description has been presented with reference to a presently preferred embodiment of the invention as illustrated in the accompanying drawings. It will be understood, however, that the present invention can be manifested in embodiments different from the described embodiment. The preceding description sets forth the presently known best mode of practicing this invention, but certainly not all possible modes. Accordingly, workers skilled in the art will readily appreciate that modifications, alterations or variations in the arrangements and procedures described above may be practiced without departing from, and while still relying upon, the essential aspects of this invention.

What is claimed is:

1. A service cart for transferring thereto and therefrom a vehicle engine assembly which includes a support frame having parallel side members, the frame being releasably matable with a vehicle chassis for movement into and out of an operative position in the vehicle through an end of the chassis, the vehicle including cart positioning means at the end thereof through which the engine assembly is movable, selectively operable latch means cooperable between the chassis and the frame in a selected position of the frame in the vehicle for securing the frame from movement relative to the chassis in a direction corresponding to removal of the frame from the chassis, and release means operable for disabling the latch means, the cart comprising
(1) a base,
(2) a pair of frame side member engaging rails,
(3) means movably mounting the rails on the base in parallel relation and spaced a distance corresponding to the spacing between the frame side members, the mounting means including
  (a) guide means for guiding the rails vertically relative to the base, and
  (b) means for adjusting the vertical distance between the base and each end of each rail, and
(4) locating means carried by the cart matable with the positioning means and operable when mated with the positioning means for operating the release means, whereby the frame can be moved relative to the chassis from said selected position onto the cart rails and removed from the chassis.

2. A cart according to claim 1 wherein the locating means are connected to the rails at one end thereof.

3. A cart according to either one of claims 1 or 2 in which the positioning means and the locating means are cooperatively arranged for substantially aligning the rails with the frame side members in the operative position of the engine assembly in the vehicle.

4. A cart according to claim 1 wherein said selected position of the frame relative to the chassis is different from the operative position of the frame in the chassis.

5. A cart according to claim 4 wherein the latch means is arranged to be overridden during movement of the frame in the chassis past said selected position to its operative position.

6. A cart according to claim 1 wherein the latch means cooperates with a selected structural feature of the frame, and including second selectively operable latch means associated with at least one of the cart rails cooperable with said selected feature of the frame for securing the frame in a received position of the frame on the cart.

7. A cart according to claim 6 wherein said selected feature of the frame is an aperture.

8. A cart according to claim 1 including manually operable means operable for disabling the latch means independently of mating of the locating means with the positioning means.

* * * * *